Nov. 13, 1951  R. C. ALLEN  2,575,242
GAS TURBINE LOCOMOTIVE
Filed May 11, 1944  2 SHEETS—SHEET 1

Inventor
R. C. Allen
by K. S. Wyman
Attorney

Nov. 13, 1951 R. C. ALLEN 2,575,242
GAS TURBINE LOCOMOTIVE
Filed May 11, 1944 2 SHEETS—SHEET 2

Inventor
R. C. Allen
by K. S. Wyman
Attorney

Patented Nov. 13, 1951

2,575,242

UNITED STATES PATENT OFFICE 2,575,242

GAS TURBINE LOCOMOTIVE

Robert C. Allen, Wauwatosa, Wis., assignor to Allis-Chalmers Manufacturing Company, Milwaukee, Wis., a corporation of Delaware Application May 11, 1944, Serial No. 535,110

3 Claims. (Cl. 105—62)

This invention relates generally to self-propelled vehicles and more particularly to self-propelled vehicles embodying a supporting traction means including an axle or the like adapted to be driven in opposite directions by one or more prime mover elements for propelling the vehicle either forward or rearward.

The object of this invention is to provide a vehicle with an improved elastic fluid type power plant which affords a high degree of maneuverability and a high tractive effort for starting in either the forward or rearward direction, which can be readily operated when the vehicle is moving in either direction and without special equipment to effect a braking effort sufficient to rapidly decelerate the vehicle to zero speed, and which is durable, simple and foolproof in operation thereby eliminating any possibility of damage to interconnected parts such as might be expected to result from an improper sequential operation of same.

The manner in which the above stated object may be accomplished in whole or in part will become readily apparent as the disclosure progresses and particularly points out additional objects, advantages and correlations of features considered of special importance and of general application although shown and described as applied to a locomotive.

Accordingly, the invention may be considered as consisting of the combinations of elements and arrangements of parts as is more fully set forth in the appended claims and in the detailed description, in which:

Figure 1:
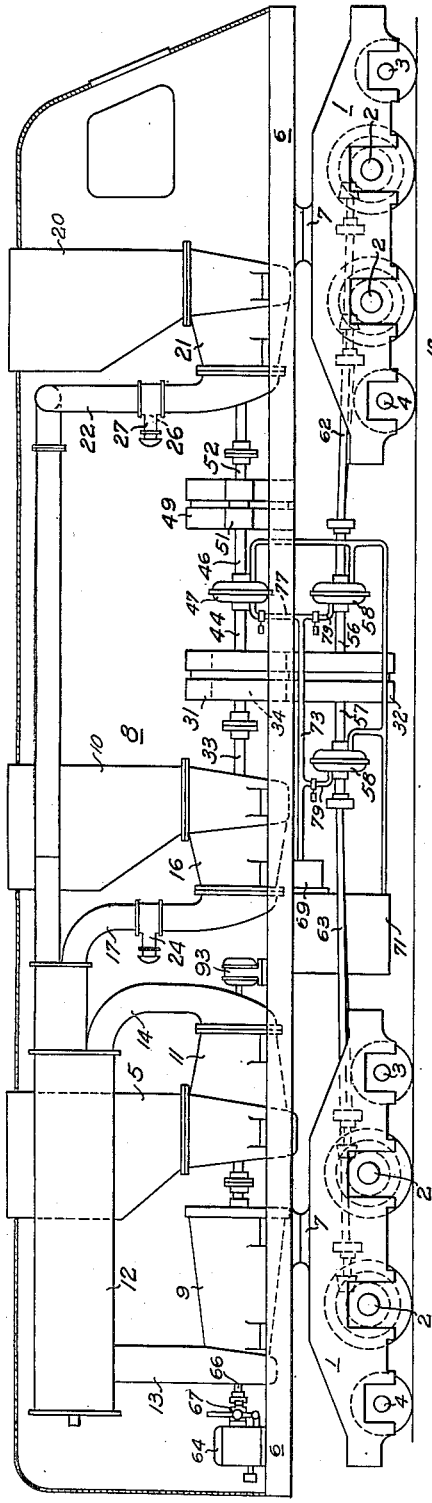
Fig. 1 is a diagrammatic side elevation of a locomotive embodying the invention with the near side removed in order to better show the arrangement of parts.
Figure 2:
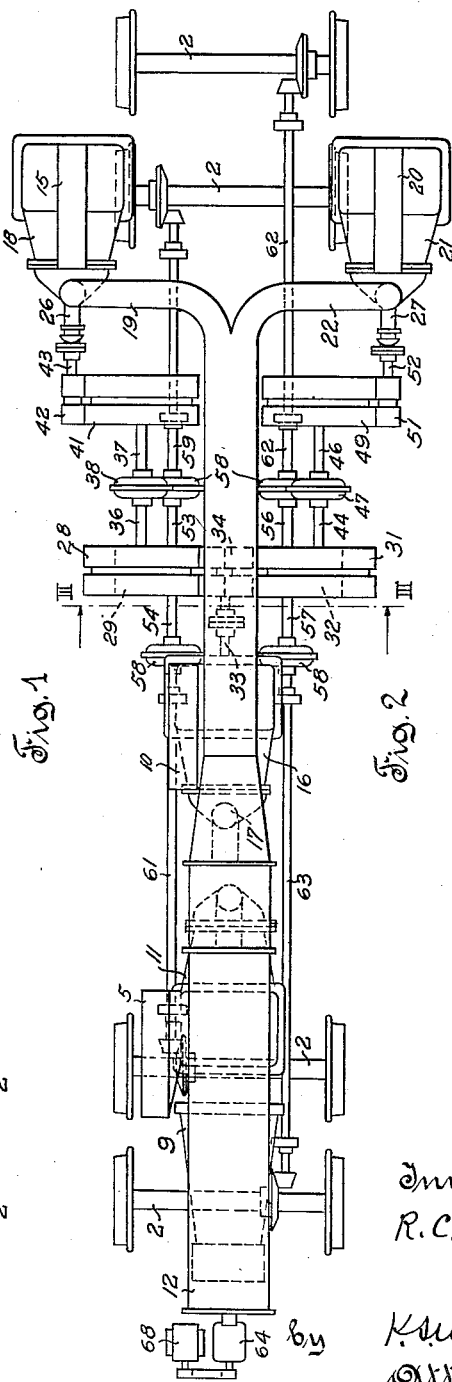
Fig. 2 is a schematic plan view of the power plant shown in Fig. 1.

Referring particularly to Figs. 1 and 2, it is seen that the invention may be applied to a locomotive type vehicle comprising a pair of spaced bogies 1 each including a pair of driving axles 2 interposed between a pilot wheel axle 3 and a trailing wheel axle 4, a main frame 6 supported on the bogies 1 by means of king-pin and socket connections 7, and a power plant 8 supported on the frame 6.

Power plant 8 comprises a continuous combustion gas generating unit consisting of a compressor 9, a turbine 11 drivingly connected with the compressor 9, and a combustion chamber 12 having its burner end connected to receive the air discharged from the compressor by means of a conduit 13 and having its discharge end connected with the inlet of the turbine 11 by means of a conduit 14, a high-speed ahead power turbine 16 having its inlet connected with the discharge of combustion chamber 12 by means of a conduit 17, a low-speed ahead power turbine 18 having its inlet connected with the discharge end of combustion chamber 12 by means of a conduit 19, and a reverse power turbine 21 having its inlet connected with the discharge end of combustion chamber 12 by means of a conduit 22; the flow of motive fluid to the power turbines 16, 18 and 21 being severally controllable by means of valves 24, 26 and 27 disposed in conduits 17, 19 and 22, respectively. Turbines 11, 16, 18 and 21 are provided with separate upward flaring exhaust conduits 5, 10, 15 and 20, respectively.

Figure 3:
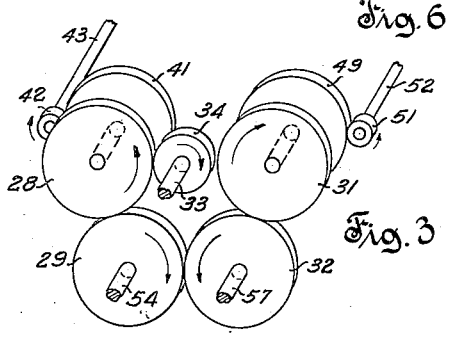
Fig. 3 is a diagrammatic perspective view of the gearing taken on line III—III of Fig. 2.
Figure 4:
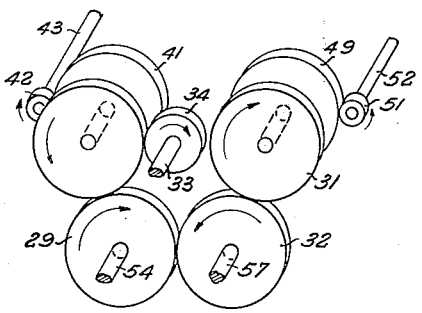
Fig. 4 is a view similar to Fig. 3 showing the relative rotation of the gears when the vehicle is being driven in the ahead direction by the starting turbine.
Figure 5:
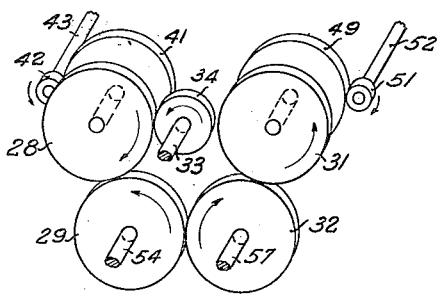
Fig. 5 is a view similar to Fig. 4 showing the relative rotation of the gears when the vehicle is being driven by the reverse turbine.

Referring also to Fig. 3, it is seen that ahead turbine 16 is directly connected with a reduction gearing comprising pairs of intermeshed gears 28, 29 and 31, 32 by means of a shaft 33 having a gear 34 thereon in mesh with the gear 28. Ahead turbine 18 is also drivingly connected with gear 28 by means of shaft 36, hydraulic coupling 38, and an alined shaft 37 having thereon a gear 41 in mesh with a pinion 42 on shaft 43 of turbine 18. Reverse turbine 21 is drivingly connected with gear 31 by means of shaft 44, hydraulic coupling 47, and an alined shaft 46 having a gear 49 thereon in mesh with a pinion 51 on shaft 52 of turbine 21.

The intermeshed driven gears 29 and 32 are in effect integral with and interconnect the adjacent ends of forward and rearward extending pairs of drive shafts 53, 54 and 56, 57, respectively, which are in turn drivingly connected with the bogie axles 2 by means of hydraulic or other coupling devices 58 and extension drive shafts 59, 61, 62 and 63, respectively; the extension shafts being preferably geared to the bogie axles 2 as is best shown in Fig. 1. Consequently, it should now be obvious that as long as the couplings 58 are capable of transmitting power, driven gears 28, 29 and 31, 32 and driving gear 34 will rotate whenever the vehicle is moving either ahead or rearward irrespective of which power turbine is operating.

Figure 6:
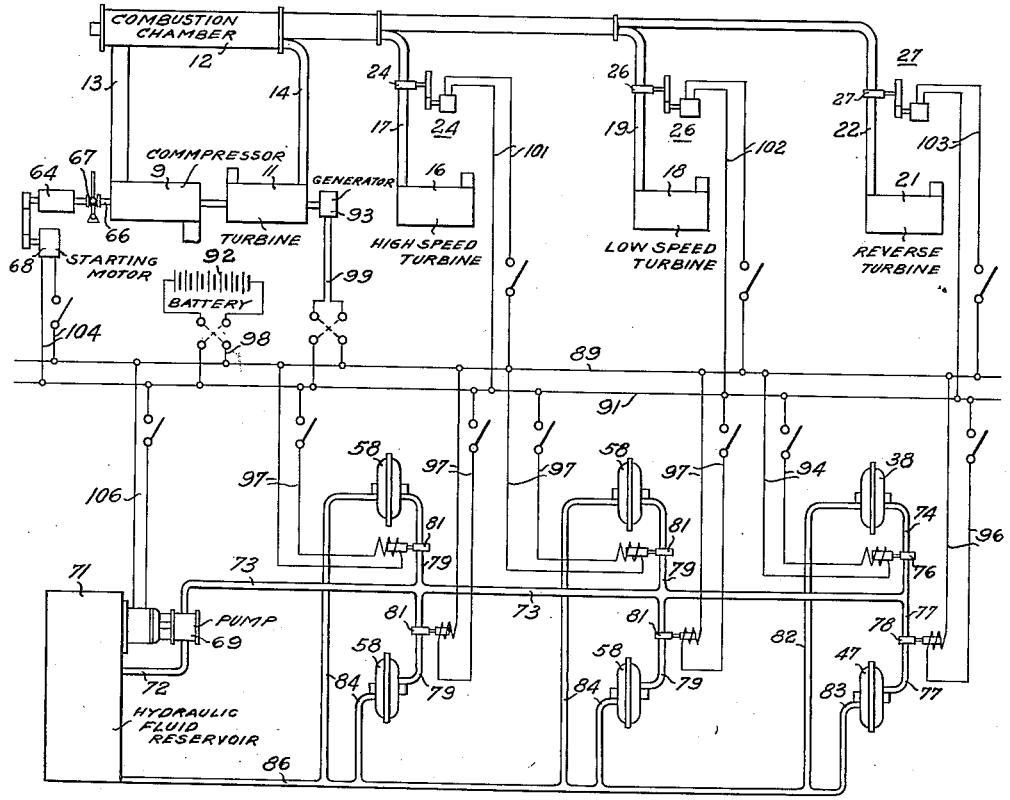
Fig. 6 is a schematic illustration of a simplified control system for the power plant shown in Fig. 1.

The gas generating unit comprising compressor 9 and turbine 11 may be started and brought up to operating speed in the usual manner by means of an internal combustion engine 64 which can be readily connected with and disconnected from the compressor shaft 66 by means of a clutch or the like 67. Referring to Fig. 6, it is seen that engine 64 may be provided with a starting motor 68 which may be electrically operated as may also the valves 24, 26 and 27 controlling the flow of motive fluid to the power turbines 16, 18 and 21, respectively. The fluid for the hydraulic couplings may be supplied by an electrically driven pump 69 which draws fluid from a reservoir 71 through a pipe 72 and discharges same into a main supply line 73 from which the fluid may pass into coupling 38 through an inlet pipe 74 including a valve 76, into coupling 47 through an inlet pipe 77 including a valve 78 and into each coupling 58 through separate inlet pipes 79 each including a valve 81; the fluid passing from the couplings 38, 47 and 58 through return pipes 82, 83 and 84, respectively, into a main return line 86 connected with reservoir 71.

The valves 76, 78, 81 may also be of the electrically operated type and arranged in separate switch controlled circuits receiving energy from bus wires 89, 91 which are in turn supplied with electrical energy by a battery 92 and/or a generator 93 driven by turbine 11; the circuits for the valves 76, 78 and 81 being designated 94, 96 and 97, respectively, and the battery 92 and generator 93 being connected in parallel relation by means of bus wires 89, 91 and separate switch controlled circuits designated 98 and 99, respectively. In addition, it should be noted that the electrically actuated motive fluid controlling valves 24, 26 and 27 are each connected across bus wires 89, 91 by means of separate switch controlled circuits designated 101, 102 and 103, respectively, and that therefore the hydraulic couplings may be severally filled and emptied and the motive fluid controlling valves 24, 26 and 27 severally opened and closed simply by opening and closing the switches in their respective control circuits. Furthermore, starting motor 68 and pump 69 are also connected across bus wires 89, 91 by means of separate switch controlled circuits designated 104 and 106, respectively.

In this connection, the electrically operated valves 24, 26, 27, 76, 78 and 81 are preferably so constructed that when their respective circuits are energized the valves are fully open and that when said circuits are deenergized the valves are fully closed. Consequently, it should be obvious that the various hydraulic couplings are rendered operative by opening their respective control valves to fill same and that the couplings are rendered inoperative by closing said valves which permits the couplings to empty through return pipes 82, 83 and 84, and that the flow of motive fluid to the power turbines can be severally controlled by opening or closing their respective valves. However, it should be understood that the control apparatus schematically shown in Fig. 6 is merely illustrative of one form of control apparatus which may be employed in practicing the invention and that other and different control apparatus may be employed, if so desired, providing the flow of motive fluid to the power turbines and the filling and emptying of at least couplings 38 and 47 can be severally controlled to at least the extent herein indicated. Moreover, it should be obvious that the control system herein described permits valves 24, 26, 27, 76, 78 and 81 or selective groups thereof to be opened or closed either sequentially or simultaneously as desired simply by appropriately opening and closing the switches controlling the same.

With the various control elements positioned as indicated in Fig. 6; the power plant is inoperative and since all switches are opened, the valves 24, 26, 27, 76, 78 and 81 are fully closed. Consequently, all of the hydraulic couplings are empty and the bus wires 89, 91 are dead. Therefore, in order to start the gas generating unit, the switch in battery circuit 98 is closed thereby energizing bus wires 89, 91 whereupon the switch in starting motor circuit 104 can be closed to energize starting motor 68 thereby rotating the internal combustion engine 64 to start same in the usual manner. When engine 64 is started, the battery circuit switch is opened and clutch 67 actuated to couple engine 64 with compressor shaft 66 thereby rotating the compressor 9 and turbine 11. As the compressor and turbine come up to minimum speed, burning is initiated in the combustion chamber and when the motive fluid thus generated is sufficient for self operation of the gas generating unit, the internal combustion engine is declutched and shut down, the switch in the generator circuit 99 is closed thereby connecting the battery and generator in parallel relation. This much of the procedure is common practice and a further description in this connection is deemed unnecessary for a complete understanding of the present invention.

With the gas generating unit operating as just described and the remaining control elements positioned as shown in Fig. 6, the vehicle may be propelled either ahead or rearward simply by filling couplings 58, by filling either coupling 38 or 47 and by opening either valve 26 or 27 to admit motive fluid either to the low speed ahead turbine 18 or to reverse turbine 21. Of course the pump motor 69 must be first energized by closing the switch in control circuit 106. In this connection, motive fluid may be first admitted to the selected one of turbines 18 and 21 before filling the appropriate couplings. If fluid is admitted to turbine 18, the speed of the vehicle may be increased by increasing the heat input to the motive fluid generating unit until the upper limit of the low speed ahead range is reached or neared whereupon the motive fluid controlling valve 24 is opened and the valve 26 closed thereby rendering turbine 16 operative to drive the vehicle throughout a higher speed range. Obviously, if the vehicle is to be propelled rearward, the valves 24 and 26 remain closed and the valve 27 is opened to admit motive fluid to turbine 21; the speed of this turbine being controlled by varying the heat input to the combustion chamber of the motive fluid generating unit as hereinbefore indicated with respect to the operation of the low speed ahead turbine 18.

In this connection, it should be noted that if turbines 16, 18 and 21 are designed to operate at anywhere near the same speeds, the high reduction ratio of meshed gears 41, 42 and 49, 51 will result in gears 28, 29, 32 and 31 being driven at much slower speeds by the operation of turbines 18 and 21 than they would be by the operation of turbine 16, that turbines 16 and 18 both operate to drive gear 28 in the same direction, and that turbine 21 operates to drive gear 28 through the medium of gears 31, 32 and 29 in a direction opposite to that produced by the operation of turbines 16 and 18. Consequently, when the vehicle is moving rearward with one or more of the couplings 58 sufficiently filled to transmit power between one or a plurality of the drive shafts and the extensions thereof, braking down to zero speed can be readily effected simply by admitting motive fluid to the high speed ahead turbine 16 and likewise when the vehicle is moving ahead, a similar braking effort can be readily effected by filling coupling 47 and admitting motive fluid to the reverse turbine 21. When the vehicle is moving rearward, an effective braking effort can also be produced by filling coupling 38 and admitting motive fluid to the slow speed ahead turbine 18. However, this maneuver requires two distinct steps, that is, the opening of valve 76 and the opening of valve 26, whereas when the braking effort is produced by turbine 16, all that has to be done is to open valve 24. Turbine 16 is in continuous driving engagement with gear 28 and consequently, braking can be more rapidly effected with turbine 16 than it can be with turbine 18 and in addition the friction and windage losses produced by maintaining turbine 16 permanently coupled with gear 28 are much less than they would be if the slow speed ahead turbine were to be so coupled.

Moreover, it is practically impossible to damage any of the various elements of the disclosed power plant by an improper sequential operation of parts since nothing the operator can do in this connection will injure or destroy the reduction gearings or any of the hydraulic couplings or turbines. Furthermore, there need be no windage loss produced by the reverse turbine when the vehicle is driven in the ahead direction by either turbine 16 or 18 since the coupling 47 can be readily emptied by closing its valve 78 thereby preventing the reverse turbine from being driven by the rotation of gear 31. Likewise there need be no windage loss produced by turbine 18 when the vehicle is being driven either by turbine 16 or by turbine 21. Furthermore, the use of separate drive shafts for each driving axle with a hydraulic coupling in each shaft between the main reduction gearing and the axle gears greatly reduces shock on the axle gear teeth and at the same time protects the main reduction gearing.

The power plant herein disclosed is durable, simple and foolproof in operation and although it has been shown and described as applied to a locomotive type vehicle, it should be understood that many features are of general vehicle application and that it is not intended to limit the invention to the particular correlations of elements and modes of operation herein disclosed as various modifications within the scope of the appended claims may occur to persons skilled in the art.

It is claimed and desired to secure by Letters Patent:

1. In a wheel supported vehicle embodying separate axles adapted to be reversibly rotated for propelling the vehicle either forward or rearward, a power plant and a power transmitting means for rotating said axles in either direction and for braking the vehicle to zero speed comprising first and second separate hydraulic clutches having fluid impelling and driven elements with their driven elements operatively connected with separate axles, a first turbine for forward propulsion, a first reduction gearing establishing a continuous positive driving connection between said first turbine and the fluid impelling elements of both of said clutches, a second turbine for rearward propulsion, a third hydraulic clutch having fluid impelling and driven elements, at least said third clutch being conditionable to render it effective or ineffective to transmit power irrespective of the relative speed of its elements, a continuous positive driving connection between the fluid driven element of said third clutch and a low speed gear of said first gearing, a second high ratio reduction gearing establishing a continuous positive driving connection between said second turbine and the fluid impelling element of said third clutch, said second turbine, second gearing and third clutch being operative, when said third clutch is effective, to rotate said first gearing and first turbine in a direction opposite to that effected by the admission of motive fluid to said first turbine, means for supplying fluid to said clutches, a source of elastic motive fluid for said turbines, first means operable at will for admitting and cutting off admission of motive fluid from said source to said first turbine, second means operable at will for admitting and cutting off admission of motive fluid from said source to said second turbine, and means operable at will irrespective of the speeds of said turbines to condition at least said third clutch to render it effective or ineffective to transmit power.

2. In a wheel supported vehicle embodying separate axles adapted to be reversibly rotated for propelling the vehicle either forward or rearward, a power plant and a power transmitting means for rotating said axles in either direction and for braking the vehicle to zero speed comprising first and second separate hydraulic clutches having fluid impelling and fluid driven elements with their driven elements operatively connected with separate axles, a first turbine for high speed forward propulsion, a first reduction gearing establishing a continuous positive driving connection between said first turbine and the fluid impelling elements of both clutches, a second turbine for rearward propulsion, a third hydraulic clutch having fluid impelling and fluid driven elements, a continuous positive driving connection between the fluid driven element of said third clutch and a low speed gear of said first gearing, a second high ratio reduction gearing establishing a continuous positive driving connection between said second turbine and the impelling element of said third clutch, a third turbine for slow speed forward propulsion, a fourth hydraulic clutch having fluid impelling and fluid driven elements, at least said third and fourth clutches being conditionable to render them severally effective or inffective to transmit power irrespective of the relative speed of the elements of the respective clutches, a continuous positive driving connection between the fluid driven element of said fourth clutch and a low speed gear of said first gearing, a third high ratio reduction gearing establishing a continuous positive driving connection between said third turbine and the impelling element of said fourth clutch, said third turbine, third gearing and fourth clutch being operative, when said fourth clutch is effective, to rotate said first gearing and first turbine in the same direction as effected by the admission of motive fluid to the first turbine, said second turbine, second gearing and third clutch being operative, when said third clutch is effective, to rotate said first gearing and first turbine in a direction opposite to that effected by the admission of motive fluid to the first turbine, means for supplying fluid to said clutches, a source of motive fluid for said turbines, first means operable at will for admitting and cutting off admission of motive fluid from said source to said first turbine, second means operable at will for admitting and cutting off admission of motive fluid from said source to said second turbine, third means operable at will for admitting and cutting off admission of motive fluid to said third turbine, means operable at will irrespective of the speeds of said turbines to condition said third clutch to render it effective or ineffective to transmit power, and means operable at will irrespective of the speeds of said turbines to condition said fourth clutch to render it effective or ineffective to transmit power.

3. In a vehicle embodying a supporting traction means adapted to be driven in opposite directions for propelling the vehicle either forward or rearward, a power plant for driving said traction means in either direction and for braking the vehicle to zero speed comprising a turbine for high speed forward propulsion, a turbine for low speed forward propulsion, a turbine for rearward propulsion, separate first and second clutches each including driving and driven elements and a means operable to establish a power transmitting connection between respective said elements irrespective of the relative speed of the elements, means including a main gearing operatively connecting the driven elements of said first and second clutches with said traction means, means establishing a continuous speed reducing, power transmitting connection between said high speed turbine and said main gearing, a first speed reducing gearing establishing a continuous positive driving connection between said low speed turbine and the driving element of said first clutch, a second speed reducing gearing establishing a continuous positive driving connection between said rearward propulsion turbine and the driving element of said second clutch, a source of motive fluid for said turbines, first means operable at will for admitting and cutting off admission of motive fluid from said source to said high speed forward propulsion turbine, second means operable at will for admitting and cutting off admission of motive fluid from said source to said low speed forward propulsion turbine, third means operable at will for admitting and cutting off admission of motive fluid to said rearward propulsion turbine, means operable at will irrespective of the speeds of said turbines for controlling the establishment and disestablishment of a power transmitting connection between the elements of said first clutch, and means operable at will irrespective of the speeds of said turbines for controlling the establishment and disestablishment of a power transmitting connection between the elements of said second clutch.

ROBERT C. ALLEN.

REFERENCES CITED

The following references are of record in the file of this patent:

UNITED STATES PATENTS

| Number | Name | Date |
| --- | --- | --- |
| 1,501,604 | Kohler | July 15, 1924 |
| 1,969,311 | Lysholm et al. | Aug. 7, 1934 |
| 2,125,163 | Hacker et al. | July 26, 1938 |
| 2,250,543 | Lysholm et al. | July 29, 1941 |

FOREIGN PATENTS

| Number | Country | Date |
| --- | --- | --- |
| 430,164 | Germany | June 10, 1926 |